United States Patent
Schuett et al.

(10) Patent No.: US 10,202,073 B2
(45) Date of Patent: Feb. 12, 2019

(54) SHADING ARRANGEMENT OF A VEHICLE ROOF

(71) Applicant: Webasto SE, Stockdorf (DE)

(72) Inventors: Thomas Schuett, Stockdorf (DE); Andreas Rockelmann, Stockdorf (DE); Hubert Boehm, Stockdorf (DE); Thorsten Richthofen, Stockdorf (DE); Johannes Thannheimer, Stockdorf (DE); Steffen Lorenz, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 93 days.

(21) Appl. No.: 15/316,755

(22) PCT Filed: Jun. 9, 2015

(86) PCT No.: PCT/EP2015/062786
§ 371 (c)(1),
(2) Date: Dec. 6, 2016

(87) PCT Pub. No.: WO2015/189178
PCT Pub. Date: Dec. 17, 2015

(65) Prior Publication Data
US 2017/0158125 A1 Jun. 8, 2017

(30) Foreign Application Priority Data
Jun. 10, 2014 (DE) .................. 10 2014 108 119

(51) Int. Cl.
*B60Q 3/208* (2017.01)
*B60J 7/00* (2006.01)
*B60Q 3/60* (2017.01)

(52) U.S. Cl.
CPC ............ *B60Q 3/208* (2017.02); *B60J 7/0007* (2013.01); *B60J 7/0015* (2013.01); *B60Q 3/60* (2017.02); *B60Q 2500/10* (2013.01)

(58) Field of Classification Search
CPC ...... B60Q 3/208; B60Q 3/60; B60Q 2500/10; B60J 7/0015
See application file for complete search history.

(56) References Cited

U.S. PATENT DOCUMENTS

2007/0115673 A1 5/2007 Chen et al.
2015/0175064 A1* 6/2015 Albert .................. B60J 7/0015
362/511

(Continued)

FOREIGN PATENT DOCUMENTS

DE 101 09 008 A1 9/2002
DE 103 13 068 A1 12/2004

(Continued)

OTHER PUBLICATIONS

International Preliminary Report on Patentability issued against corresponding International Application No. PCT/ep2015/062786 dated Dec. 22, 2016.

(Continued)

*Primary Examiner* — David V Bruce
(74) *Attorney, Agent, or Firm* — Fitch, Even, Tabin & Flannery, LLP

(57) ABSTRACT

A shading arrangement of a transparent roof section of a passenger car, having a flat shading element displaceable between a shading position and an uncovering position and having a lower side facing towards a vehicle interior and an upper side facing towards a vehicle environment. An indirect illuminating device can be provided which illuminates the shading element from the upper side and/or the lower side. The shading element can have a lighting effect material that interacts with the illuminating device.

14 Claims, 3 Drawing Sheets

(56) References Cited

U.S. PATENT DOCUMENTS

2016/0236613 A1* 8/2016 Trier .................. B60R 13/04
2017/0305339 A1* 10/2017 Lin ..................... F21S 4/28

FOREIGN PATENT DOCUMENTS

| DE | 10 2006 047 887 A1 | 5/2007 |
| DE | 10 2005 055 828 A1 | 6/2007 |
| DE | 10 2011 103 319 A1 | 12/2011 |
| EP | 2 135 761 A1 | 12/2009 |
| FR | 2 861 665 A1 | 5/2005 |
| FR | 2 991 931 A1 | 12/2013 |
| KR | 10-2009-0115543 A | 11/2009 |
| KR | 10-2010-0020318 A | 2/2010 |
| WO | 2011/007070 A1 | 1/2011 |

OTHER PUBLICATIONS

International Search Report for PCT/EP2015/062786 dated Sep. 18, 2015; English translation submitted herewith (7 pages).

* cited by examiner

SHADING ARRANGEMENT OF A VEHICLE ROOF

CROSS-REFERENCE TO RELATED APPLICATIONS

This application is a U.S. national phase application filed under 35 U.S.C. § 371 of International Application No. PCT/EP2015/062786, filed Jun. 9, 2015, designating the United States, which claims priority from German Application No. 10 2014 108 119.6, filed Jun. 10, 2014, which are hereby incorporated herein by reference in their entirety for all purposes.

FIELD

The invention relates to a shading arrangement of a transparent roof section of a passenger car.

BACKGROUND

Such shading arrangements are known from practice and are realized as roller blind arrangements, for example, comprising a roller blind web which can be unwound from a winding device for shading a transparent roof section of the corresponding passenger car or can be wound up on the winding device for uncovering the transparent roof section, respectively. At an edge spanning in the transverse direction of the vehicle, the roller blind web is connected to the winding device formed in particular as a winding shaft. The edges arranged on both sides of the roller blind web relative to a vertical longitudinal center plane of the roof are each guided in a guide track spanning the longitudinal direction of the vehicle. Hence, the roller blind web can be kept taut in the transverse direction of the vehicle.

Alternatively, it is known from practice to use a so-called sliding headliner for shading a transparent roof section of a passenger car, said sliding headliner comprising a stiff, plate-like carrier body guided in lateral guide tracks spanning in the longitudinal direction of the vehicle via lateral gliders.

In known passenger cars, a light is generally arranged in the sliding headliner area for illuminating a vehicle interior. This light is often arranged at the front of the roof section. Additionally, another light can be provided above the backseat of the corresponding vehicle for illuminating the back of the car.

SUMMARY

The object of the invention is to create a shading arrangement according to the type mentioned above which allows for an optimal design of a sliding headliner of a vehicle interior.

According to the invention, this object is attained by the shading arrangement having the features of claim 1.

According to the invention, a shading arrangement of a transparent roof section of a passenger car is therefore proposed comprising a shading element which is displaceable between a shading position and an uncovering position and comprises a lower side facing towards the vehicle interior and an upper side facing towards a vehicle environment. Furthermore, the shading arrangement comprises an indirect illuminating device illuminating the shading element from the upper side and/or lower side, said shading element comprising a lighting effect material which interacts with the illuminating device.

The core of the invention is therefore that the vehicle interior is illuminated indirectly so that the illumination is not directed at the vehicle interior but rather directed at the shading element equipped with the lighting effect material. The lighting effect material is activated by being illuminated which in turn leads to an at least sectional illumination of the shading element. Thus, the vehicle interior can be illuminated or lit up by this illumination if necessary. Since the lighting effect material can be formed at the shading element to the customer's specifications, various variation possibilities exist regarding the design and function of the illuminated shading element. Logos and logotypes can in particular be depicted by the lighting effect material.

In a specific embodiment of the shading arrangement according to the invention, the lighting effect material is formed by phosphorescent or fluorescent material, which is applied to the shading element at its lower side and/or its upper side and can in particular be an imprinted paste.

Alternatively or additionally, the lighting effect material can be formed by phosphorescent or fluorescent thread which can be woven or knitted into a textile material of the shading element. It is also conceivable to weave or knit the shading element solely from phosphorescent or fluorescent thread.

The phosphorescent or fluorescent material is activated by being illuminated by means of indirect illumination.

In an alternative embodiment of the shading arrangement according to the invention, the lighting effect material is made of a reflective material with which the shading element is provided.

The reflective material is made of reflective thread, for example, woven or knitted into a textile material of the shading element. The reflective thread can be worked into the entire flat shading element or sections of it, for example only in an edge area of the shading element, so that a specific edge illumination of the shading arrangement is realized.

However, a reflective paste, a reflective dressing and/or a reflective lining can be applied to the shading element as a reflective material.

Due to the reflective design of the shading arrangement according to the invention, a good illumination of a vehicle interior can be realized with little cost and a homogenous appearance.

In order to be able to choose a color for the illumination of the flat shading element realized according to the invention, a corresponding treatment of the thread can be carried out in an embodiment having reflective thread, so that a specific color is reflected by the light emitted by the indirect illuminating device.

In an alternative embodiment of the shading arrangement according to the invention, the lighting effect material comprises a diffuser material which transforms an illumination at a certain point into an areal lighting effect. This can be realized, for example, with a woven effect textile which produces variable, three-dimensional lighting effects by interacting with an LED background lighting. Hence, spatial structures made of light having penetration, a plurality of effects, shapes and colors can be realized. Known woven effect textiles are available having various optical features and material properties. By means of the effect textiles, effects of varying intensity, length, brightness, shape and depth can be realized. The surfaces can comprise different transmission values and colors. When using a material which acts as a diffuser and which can be illuminated by the illuminating device, the light can be divided in such a manner that a large-surface illumination or also a specific pattern results from a background illumination at certain points.

The shading element can comprise a textile web, in particular a roller blind web.

In a specific embodiment of the shading arrangement according to the invention, the textile web is illuminated at the upper side and is formed as a spacer fabric whose upper side is provided with the phosphorescent or fluorescent material. In particular the upper side of the spacer fabric can be imprinted with the phosphorescent or fluorescent material. By illuminating the spacer fabric from behind, meaning illuminating the upper side of the spacer fabric, the light emitted from the phosphorescent or fluorescent material can shine through the fabric construction formed by the spacer fabric into the vehicle interior. It is also conceivable to provide the spacer fabric with a specific phosphorescent or fluorescent thread at the upper side.

In an embodiment of the shading element having a textile web, the illuminating device can be integrated into a tension bow of the textile web and/or in a back part of the roof frame.

Alternatively, the shading element can also be a sliding headliner. In an embodiment of the shading element as a sliding headliner, the illuminating device can be integrated into a stiff and areal carrier body of the sliding headliner.

In a preferred embodiment of the shading arrangement according to the invention, however, the illuminating device is arranged at lateral guide tracks in which the shading element is guided. Depending on the embodiment, the illuminating device can be arranged at the guide tracks above or below the plane of the shading element.

Preferably, the illuminating device is formed by LEDs. This is a cost-efficient type of illumination which also offers many variation possibilities regarding the coloring of the LEDs. The illuminating device can also comprise a light conductor, at least one LED being able to be placed at at least one end of the light conductor.

Further advantages and advantageous configurations of the subject matter of the invention can be taken from the description, the drawings and the claims.

BRIEF DESCRIPTIONS OF THE DRAWINGS

In the drawing, exemplary embodiments of a shading arrangement according to the invention are shown in a schematically simplified way and are described in the following description. In the figures.

DETAILED DESCRIPTION

Figure 1:
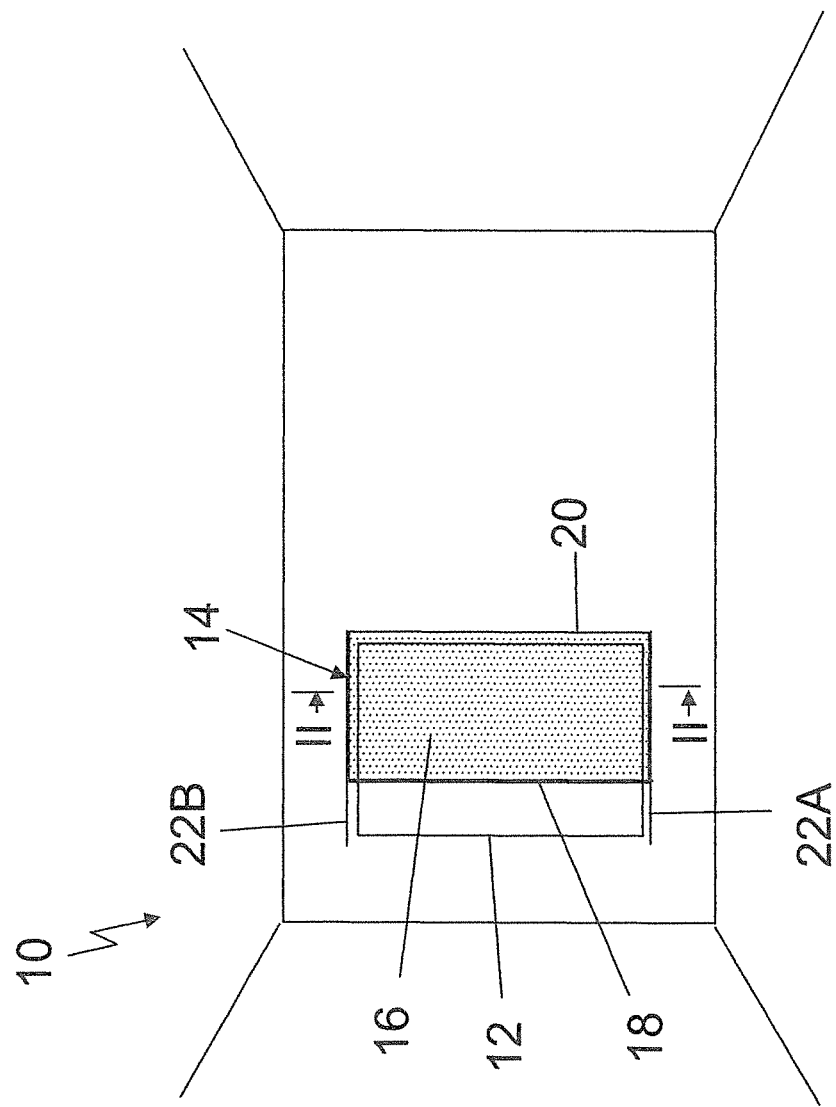
FIG. 1 shows a schematic top view on a roof of a passenger car having a roller blind arrangement according to the invention.

In FIG. 1, a vehicle roof 10 of a passenger car not further illustrated is shown, said passenger car comprising a roof section 12 which can be closed or at least partially opened by means of a transparent lid element, not further illustrated, of a roof opening system.

For shading the roof section 12, the vehicle roof 10 comprises a roller blind arrangement 14 which is a shading arrangement and comprises a roller blind web 16 made of fabric which can be folded or wound up.

The roller blind web 16 comprises a tension bow 18 at its free frontal side. At the edge facing away from the tension bow 18, the roller blind web 16 can be wound up on a winding shaft 20 spanning in the transverse direction of the vehicle. For this purpose, the winding shaft 20 comprises a winding tube mounted rotatably and pretensioned by means of a winding spring in the winding direction of the roller blind web 16. When releasing the tension bow 18 or when displacing the tension bow 18 in direction of the winding shaft 20, respectively, the roller blind web 16 can wind itself up automatically.

Relative to a vertical longitudinal center plane of the roof, the roller blind web 16 and the tension bow 18 are each guided on both sides in a guide track 22A and 22B, respectively, fixed to the roof, said guide tracks 22A and 22B spanning along a corresponding lateral edge of the roof section 12. The guide tracks 22A and 22B can be part of the roof opening system or solely be allocated to the roller blind arrangement 14.

The actuation of the roller blind arrangement 14 can be carried out manually or also by means of a corresponding electric drive.

Figure 2:
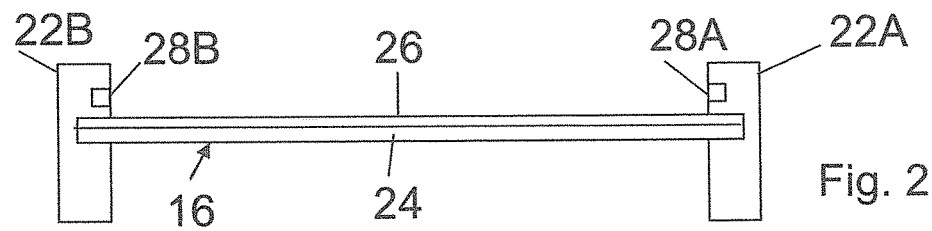
FIG. 2 shows a schematic cut through the roller blind arrangement according to the invention along the line II-II in FIG. 1.

The roller blind web 16, which can be taken from FIG. 2 as a sectional view together with the guide tracks 22A and 22B and presents a shading element of the roller blind arrangement 14, comprises a flat carrier fabric 24 made of a textile fabric comprising a lower side facing the vehicle interior and an upper side facing the vehicle environment. At the upper side, a coating 26 made of a phosphorescent or fluorescent paste is printed onto the carrier fabric, on the entire surface in the case at hand. Alternatively, the paste could be printed onto the carrier fabric 24 according to a specific pattern.

The guide tracks 22A and 22B each comprise an indirect illuminating device 28A and 28B, respectively, at the inner side facing towards the vertical longitudinal center plane of the roof, said illuminating device 28A and 28B, respectively, being formed by several LEDs arranged above the plane of the roller blind web 16 and spread out in the longitudinal direction of the corresponding guide track 22A and 22B, respectively.

When actuating the illuminating devices 28A and 28B, which is an indirect illuminating device regarding the vehicle interior, the upper side of the roller blind web 16 is illuminated, so that the coating 26 formed by the paste made of phosphorescent and fluorescent material is activated, meaning it starts to glow, and allows an illumination of the vehicle interior through the carrier fabric 24. The coating is therefore made of a lighting effect material.

Figure 3:
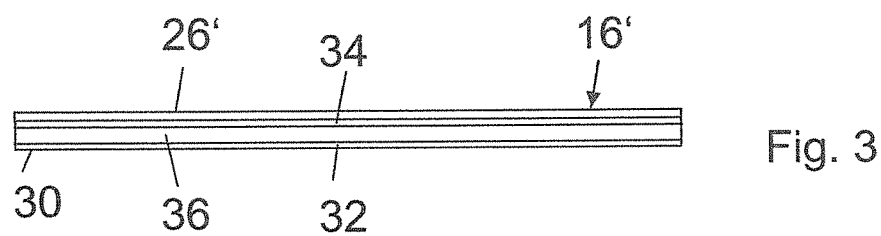
FIG. 3 shows a cut through an alternative embodiment of a roller blind arrangement.

FIG. 3 shows a cut of an alternative embodiment of a roller blind web 16' which can be used instead of the roller blind web 16 shown in the roller blind arrangement 14 in FIG. 1. The roller blind web 16' is formed by a spacer fabric 30, meaning by warp-knitted fabric webs 32 and 34, which are kept apart by keeping spacing pile threads 36. The fabric web 34 facing towards the vehicle environment, meaning the upper side of the roller blind web 16', in turn, is printed with a paste which is made of a phosphorescent or fluorescent material. Hence, the coating 26' is also made of a lighting effect material. When illuminating the upper side of the roller blind web 16' provided with the coating 26', an illumination of the vehicle interior is realized through the web fabric 32 and 34.

In an alternative embodiment of a spacer fabric, which can be induced to glow via the illuminating devices 28A and 28B arranged in the guide tracks 22A and 22B, the web fabric arranged at the upper side is made of special thread having phosphorescent or fluorescent qualities. In particular, thread can be knitted into the web fabric 34 in such a way that a logo and/or a logotype lights up in the roller blind web when illuminated by means of the illuminating device 28A and 28B.

Figure 4:
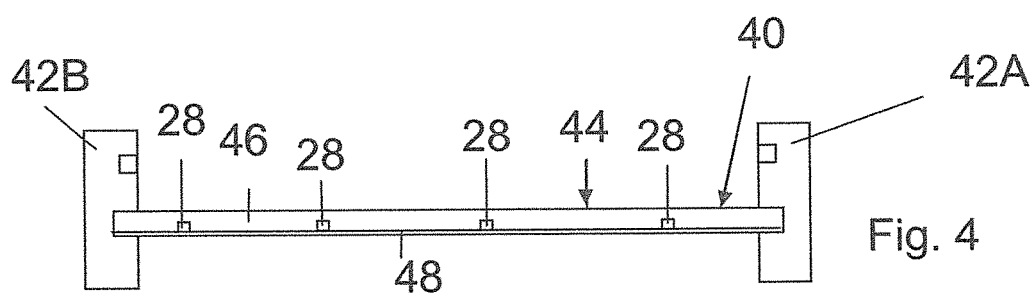
FIG. 4 shows a cut through a sliding headliner of an alternative embodiment of the shading arrangement according to the invention.
Figure 5:
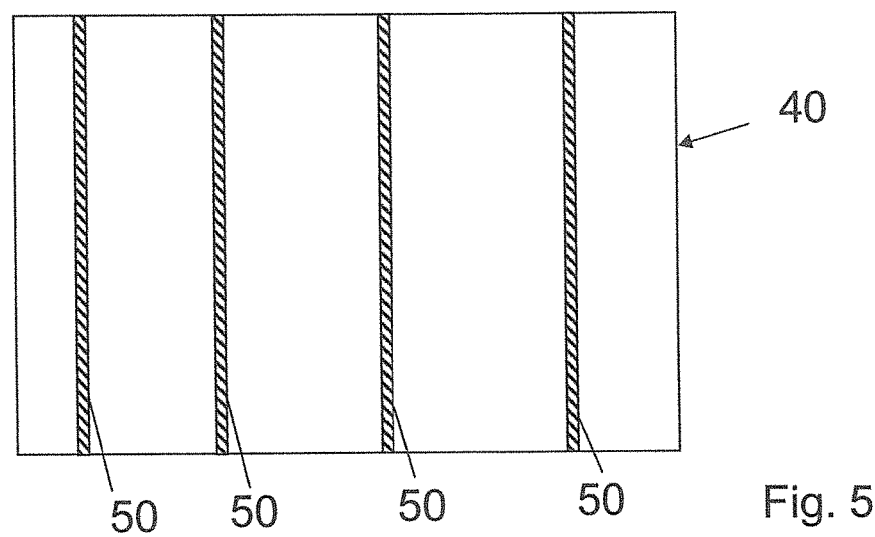
FIG. 5 shows a bottom view of the sliding headliner.

A shading arrangement 40 is shown in FIGS. 4 and 5 which comprises lateral guide tracks 42A and 42B in which a sliding headliner 44 is guided displaceably. The sliding headliner 44, which is a shading element, serves to at least partially shade a transparent roof section of a passenger car.

The sliding headliner 44 comprises an essentially rigid and flat carrier body 46, at the lower side of which, meaning at the side facing towards the vehicle interior, a fabric is lined which, at sections, consists of a diffuser material forming a lighting effect material, said diffuser material transforms an illumination at certain points into a flat lighting effect. For this purpose, LEDs are integrated into the carrier body 46 at the lower side, said LEDs being an indirect illuminating device 28 and converting the emitted light according to the strip 50 shown in FIG. 5 into a striped pattern of the fabric 48 when actuated.

In order to be connected to the power supply of the vehicle, the LEDs are connected to sliding contacts formed at the edges of the carrier body 46, said sliding contacts interacting with corresponding gliding contacts in the guide tracks 42A and 42B.

In an alternative embodiment, an effect material comprising a diffuser material can be used as a roller blind web according to the roller blind arrangement in FIGS. 1 and 2. In this case, the illumination of the roller blind web can also be realized via an illuminating device arranged in the guide tracks or also via an illuminating device arranged in the tension bow or in a back part of a roof frame.

Figure 6:
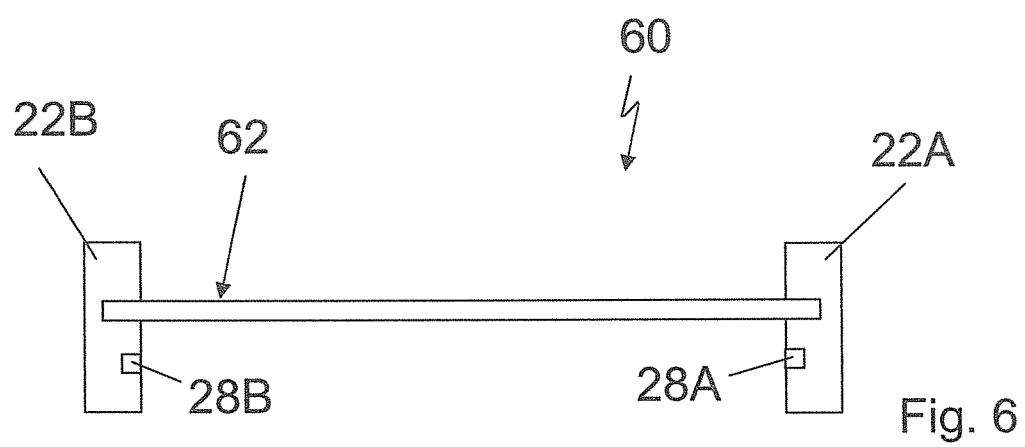
FIG. 6 shows a cut corresponding to the one in FIG. 2 of a roller blind arrangement according to another alternative embodiment.

In FIG. 6, another embodiment of a shading arrangement according to the invention is shown. This shading arrangement is a roller blind arrangement 60 comprising lateral guide tracks 22A and 22B according to the embodiment shown in FIGS. 1 and 2 in which a roller blind web 62 forming a shading element is guided with its lateral edges.

The roller blind web 62 is made of woven or knitted fabric which is at least partially made of reflective thread. The reflective thread can be woven or knitted into the entire fabric of the roller blind web 62 or into sections thereof, for example only in the edge area adjacent to the guide tracks 22A and 22B.

The guide tracks 22A and 22B each comprise an illuminating device 28A and 28B, respectively, made of LEDs at the inner sides facing towards the vertical longitudinal center plane of the roof and each arranged underneath the plane of the roller blind web 62, the roller blind web 62 being able to be illuminated from underneath by means of the illuminating device 28A and 28B, respectively. The vehicle interior can be illuminated or lit up in an indirect manner via the reflectivity of the roller blind web 62 due to the reflective thread worked into the fabric.

Figure 7:
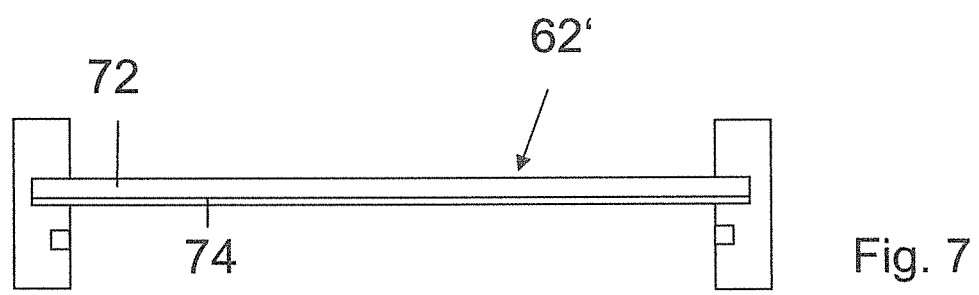
FIG. 7 shows a cut corresponding to FIG. 2 of a roller blind arrangement according to another alternative embodiment.

In FIG. 7, another alternative embodiment of a roller blind arrangement 70 is shown which essentially corresponds to the embodiment shown in FIG. 6 but differs in that it comprises a roller blind web 62' comprising a carrier layer 72 made of textile material, which carries a coating 74 made of phosphorescent and/or fluorescent material at the lower side of the carrier layer 72, meaning at the side facing towards the vehicle interior. The coating 74 can be made of applied thread, pastes, dressings or a lining.

The invention claimed is:

1. A shading arrangement of a transparent roof section of a passenger car, comprising: an areal shading element which is displaceable between a shading position and an uncovering position and comprises a lower side facing towards a vehicle interior and an upper side facing towards a vehicle environment, wherein an indirect illuminating device is provided, and the shading element comprises a light effect material which interacts with the illuminating device, the indirect illuminating device illuminating the shading element from the upper side and/or the lower side, wherein the lighting effect material is made of a phosphorescent and/or fluorescent material which is arranged at the lower side and/or the upper side of the shading element or the lighting effect material is formed by phosphorescent and/or fluorescent thread or the lighting effect material is made of a reflective material or the lighting effect material comprises a diffusor material.

2. The shading arrangement according to claim 1, wherein the phosphorescent and/or fluorescent material is an imprinted paste.

3. The shading arrangement according to claim 1, wherein the reflective material is made of reflective thread.

4. The shading arrangement according to claim 1, wherein the shading element comprises a textile web that is a roller blind web.

5. The shading arrangement according to claim 4, wherein the textile web is illuminated from the upper side and is formed as a spacer fabric which is provided with the phosphorescent and/or fluorescent material on the upper side.

6. The shading arrangement according to claim 4, wherein the illuminating device is integrated into a tension bow of the textile web.

7. A shading arrangement of a transparent roof section of a passenger car, comprising: an areal shading element which is a sliding headliner and which can be displaced between a shading position and an uncovering position and which comprises a lower side facing a vehicle interior and an upper side facing a vehicle environment, wherein an indirect illuminating device is provided which is integrated into a rigid and areal carrier body of the sliding headliner, and in that a lighting effect material is arranged on the carrier body and interacts with the illuminating device, wherein the lighting effect material is made of a phosphorescent and/or fluorescent material which is arranged at the lower side and/or the upper side of the shading element or the lighting effect material is made of phosphorescent and/or fluorescent thread, or the lighting effect material is made of a reflective material.

8. The shading arrangement according to claim 7, wherein the phosphorescent and/or fluorescent material is an imprinted paste.

9. The shading arrangement according to claim 7, wherein the reflective material is made of reflective thread.

10. The shading arrangement according to claim 7, wherein the shading element comprises a textile web.

11. The shading arrangement according to claim 1, wherein the shading element is guided in lateral guide tracks and the illuminating device is arranged at the guide tracks.

12. The shading arrangement according to claim 1, wherein the illuminating device comprises LEDs.

13. The shading arrangement according to claim 1, wherein the illuminating device comprises a light conductor.

14. The shading arrangement according to claim 13, wherein the light conductor comprises at least one LED arranged at at least one end of the light conductor.

* * * * *